Feb. 3, 1970 C. F. JUENG 3,492,789
METHOD AND APPARATUS FOR EXHAUSTING
GASES FROM INDUSTRIAL BUILDINGS
Filed May 16, 1968
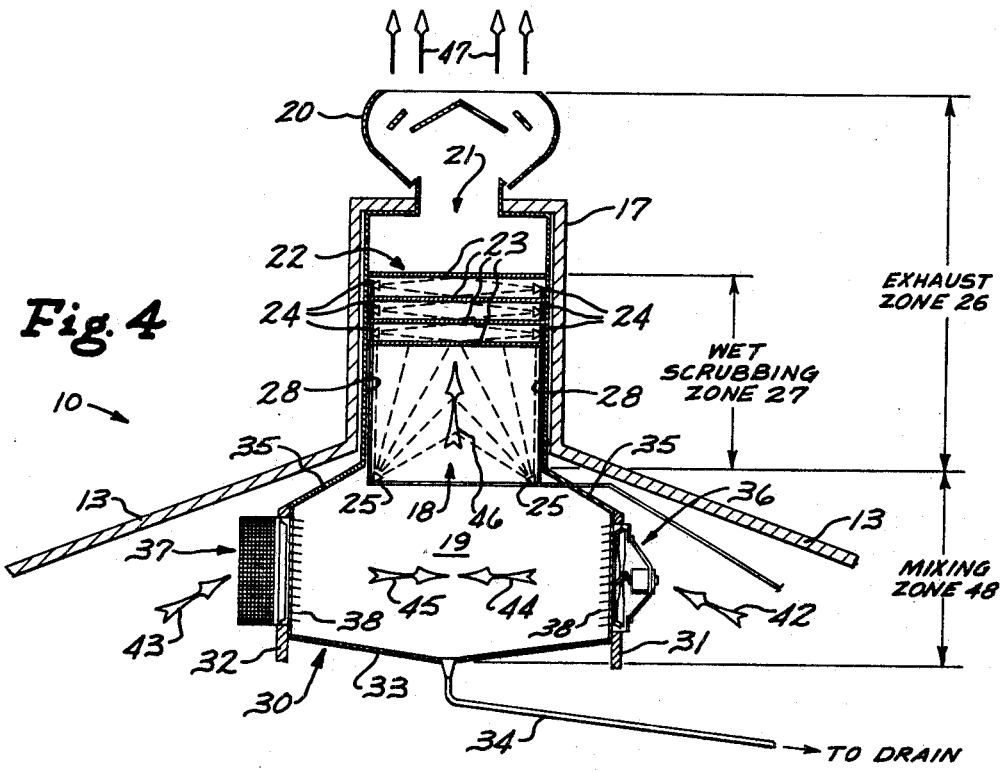
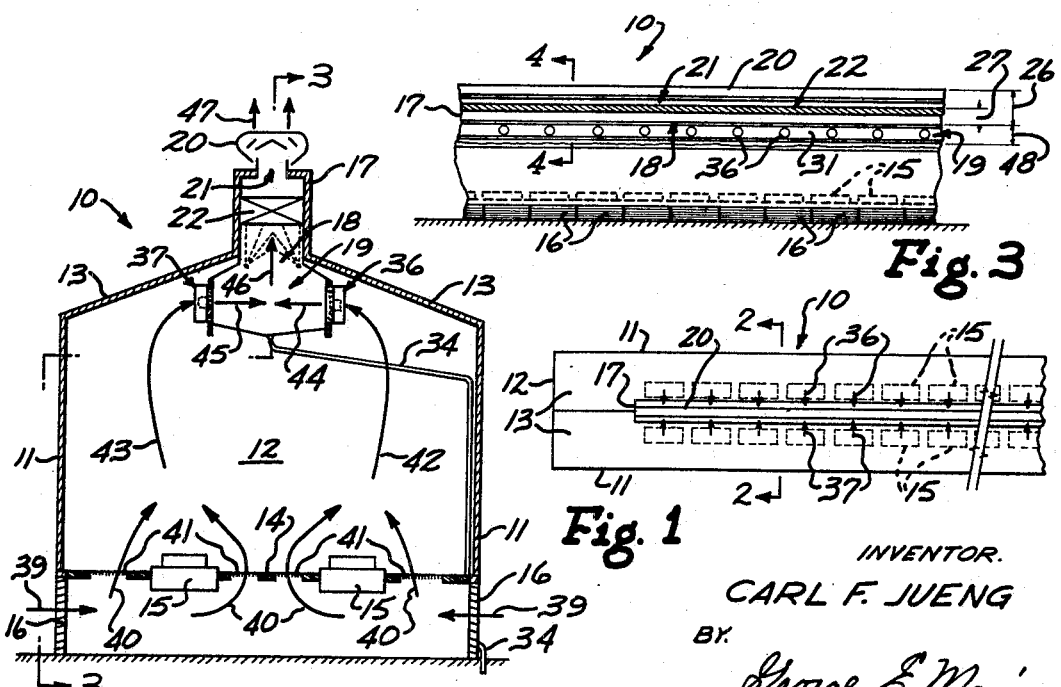
INVENTOR.
CARL F. JUENG
BY
George E. Manias
AGENT

United States Patent Office 3,492,789
Patented Feb. 3, 1970

3,492,789
METHOD AND APPARATUS FOR EXHAUSTING GASES FROM INDUSTRIAL BUILDINGS
Carl F. Jueng, Pittsburgh, Pa., assignor to H. H. Robertson Company, Pittsburgh, Pa., a corporation of Pennsylvania
Filed May 16, 1968, Ser. No. 729,625
Int. Cl. B01d 51/00, 47/06
U.S. Cl. 55—94      10 Claims

ABSTRACT OF THE DISCLOSURE

Industrial gases are exhausted from buildings into the atmosphere through a wet scrubbing zone. The exhaust gases are split into two separate streams which are separately pressurized and impinged against one another in a mixing zone prior to introduction into the wet scrubbing zone. Apparatus is provided for carrying out the method.

BACKGROUND OF THE INVENTION

Field of the invention

This invention relates to the ventilation of industrial buildings, and more particularly, to method and apparatus for exhausting heated gases from industrial buildings for the manufacture of aluminum or similar products.

Description of the prior art

The production of aluminum is efficiently and economically accomplished by the electrolysis of a fused salt bath. The electrolytic cells—pots containing the fused salt—generate large amounts of heat which is transferred to the surrounding air. In the past, the heated air has been removed from the industrial building by gravity ventilation systems, such as shown in U.S. Patent 2,907,263 or by power-actuated ventilation systems, such as shown in U.S. Patent 2,997,132.

The raw materials which comprise the aforesaid fused salt, contain fluorine in combined state. Elemental fluorine is released into the waste gases during electrolysis. Despite efficient waste gas collection systems, some fluorine escapes into the interior of the industrial plant. The industrial plant exhaust gases even though they have a relatively low concentration of fluorine, cannot be discharged directly into the atmosphere. Accordingly, wet scrubbing apparatus is conventionally provided through which the industrial plant waste gases are passed prior to being discharged into the atmosphere. Such wet scrubbing systems are illustrated in the aforesaid U.S. Patents 2,907,263 and 2,997,132.

The efficiency of such wet scrubbing apparatus is good. However, fluorine, in the form of hydrofluoric acid may escape from the wet scrubbing apparatus. The hydrofluoric acid is at an extremely low concentration in the exhaust gases and is readily disssipated into the atmosphere. However, the useful operating life of exhaust fans positioned downstream of the wet scrubbing apparatus, is significantly reduced by corrosion attributed to the hydrofluoric acid escaping from the wet scrubbing apparatus.

SUMMARY OF THE INVENTION

An object of this invention is to provide an improved method and apparatus for exhausting gases from an industrial building containing apparatus which generates heat.

Another object of this invention is to provide improved ventilating apparatus wherein exhaust fans are positioned upstream of the wet scrubbing zone and out of contact with corrosive fluids escaping from the wet scrubbing zone.

Still another object of this invention is to provide improved ventilation apparatus wherein a single exhaust stream of relatively low velocity exhaust gases is produced—the low velocity exhaust gases being more evenly distributed across the wet scrubbing zone to permit utilization of substantially all of the surface area of filter mats provided in the wet scrubbing zone.

In accordance with this invention, the exhaust gases are diverted into two sets of separate streams, each set consisting of one or a plurality of streams. The streams of each set are separately pressurized and directed into a mixing zone in opposition to each other to comingle them into a single exhaust stream having a greater pressure than that of the building. Thereafter, the single exhaust stream is delivered through the wet scrubbing zone and thence into the atmosphere.

The streams are separately pressurized, for example, by fan means disposed on opposite sides of the mixing zone. The fan means are positioned to direct the pressurized streams horizontally in opposition to each other. Positioning the fan means upstream of the wet scrubbing zone avoids contact of the fan means with corrosive fluids which may escape from the wet scrubbing zone.

Further in accordance with this invention, the single exhaust stream is directed vertically through the wet scrubbing apparatus; the mixing zone extends continuously above the heat generating apparatus; and the fan means are disposed at spaced locations along the length of the mixing zone. Accordingly, the pressurized streams directed into the mixing zone commingle and expand horizontally and vertically thereby reducing their velocity to a low value prior to being discharged through the wet scrubbing zone.

BRIEF DESCRIPTION OF THE DRAWINGS

FIGURE 1 is a fragmentary schematic plan view of an industrial building incorporating the ventilation apparatus of this invention;

FIGURE 2 is a cross-sectional view, on an enlarged scale, taken along the line 2—2 of FIGURE 1;

FIGURE 3 is a cross-sectional view, on a reduced scale, taken along the line 3—3 of FIGURE 2; and FIGURE 4 is a cross-sectional view, on an enlarged scale, taken along the line 4—4 of FIGURE 3, illustrating the ventilation apparatus of this invention.

DESCRIPTION OF THE PREFERRED EMBODIMENT(S)

Referring FIGURES 1, 2 and 3, there is schematically illustrated an industrial building 10 having side walls 11, end walls 12 and a pitched roof 13. The building 10 is provided with an elevated floor 14 supporting apparatus, such as a plurality of electrolytic pots 15 arranged in a pair of spaced rows. The building 10 includes air inlet means, such as operating louvers 16, provided in the side walls 11 below the elevated floor 14. The operating louvers 16 extend continuously along the side walls 11 for a distance equal to at least the overall length of the rows of electrolytic pots 15.

At the ridge of the pitched roof 13, there is provided exhaust duct means comprising a cupola 17 extending continuously along the pitched roof 13 for a distance equal to at least the overall length if the rows of electrolytic pots 15. The cupola 17 communicates at its lower end through connection means comprising opening 18, with a mixing chamber 19 which will be more fully described later in the specification. The cupola 17 may be provided with conventional ventilator 20 communicating with the interior of the cupola 17 through throat opening 21.

Within the cupola 17 there is provided wet scrubbing apparatus schematically illustrated at 22. As best shown in FIGURE 4, the wet scrubbing apparatus 22 may comprise horizontally extending, vertically space-apart filter mats 23; spray nozzles 24 disposed between adjacent pairs of the filter mats 23; and inlet spray nozzles 25 positioned in the region of the throat opening 18. The spray nozzles 24, 25 privide liquid sprays for removing dust and other contaminants from the exhaust gases. The wet scrubbing apparatus 22 is positioned horizontally and extends continuously along the entire length of the cupola 17.

The cupola 17 and the ventilator 20 cooperate to define an exhaust zone 26. A wet scrubbing zone 27 which includes the wet scrubbing apparatus 22, is presented within the exhaust zone 26. Exhaust gases pass through the wet scrubbing zone 27 wherein they are cleaned prior to being discharged into the atmosphere.

In accordance with the present invention, mixing chamber means 30, FIGURE 4, is provided comprising opposed side walls 31, 32, a trough-like bottom wall 33 communicating with drain conduits 34 (only one shown), and upper walls 35 which join the cupola 17 at the opening 18. The trough-like bottom wall 3 receives the liquids from the wet scrubbing apparatus 22 and discharges them through the drain conduits 34 to suitable waste disposal systems.

A first plurality of exhaust fans 36 is provided in the side wall 31 and a second plurality of exhaust fans 37 is provided in the side wall 32 of the mixing chamber means 30. The exhaust fans 36, 37 are spaced along the length of the side walls 31, 32 as shown in FIGURE 3. Preferably, each of the exhaust fans 36 has a corresponding exhaust fan 37 positioned directly opposite thereto, as indicated schematically in FIGURE 1 by the arrows 36, 37. As a result, the exhaust fans 36, 37 introduce separate pressurized streams of exhaust gases into the mixing chamber 19 in opposition to each other to commingle them into a single exhaust stream, as will hereinafter be more fully described. Each of the exhaust fans 36, 37 is provided with a normally closed louver 38 whose blades are displaced into an open position upon energization of the exhaust fan.

Referring again to FIGURE 2, atmospheric air schematically illustrated by the arrows 39, enters both sides of the building 10 through the operating louvers 16. The atmospheric air passes upwardly in streams 40 through floor openings 41 provided in the elevated floor 14 on both sides of the electrolytic pots 15. The heat radiated by the electrolytic pots 15 is transferred to the streams 40. The streams 40, now exhausting gases, are diverted into separate streams indicated by the arrows 42, 43, under the suction provided by the exhaust fans 36, 37.

As best shown in FIGURE 4, the separate streams 42, 43 are each separately pressurized by the exhaust fans 36, 37, respectively, to provide pressurized streams 44, 45. By virtue of the opposed relation of the exhaust fans 36, 37, the pressurized streams 44, 45 are directed horizontally into the mixing zone 19 in opposition to each other to commingle them into a single exhaust stream indicated by the arrow 46. The exhaust stream 46 has a static pressure greater than the static pressure of the gases within the building 10.

The single exhaust stream 46 then passes vertically through the wet scrubbing zone 27 wherein the contaminants are scrubbed from the exhaust gases which are then discharged into the atmosphere as essentially clean streams indicated by the arrows 47 issuing from the ventilator 20.

In the preferred arrangement, the side walls 31, 32 of the mixing chamber means 30 are disposed outboard of the side walls 28 of the cupola 17, whereby the width of the mixing chamber means 30 is greater than the corresponding width of the cupola 17. The mixing chamber means 30 extends continuously along the length of the cupola 17 to provide a continuous mixing zone 44 (FIGURES 3 and 4). Furthermore, the opposed pairs of exhaust fans 36, 37 are spaced along the length of the mixing chamber 19. The overall arrangement is such that the pressurized streams 44, 45 issuing from the opposed exhaust fans 36, 37 are directed horizontally into the mixing zone 48 to commingle them into the single exhaust stream 46. During commingling, the exhaust gases constituting the pressurized streams 44, 45 expand vertically and longitudinally of the mixing chamber 19 thereby reducing their velocity. Thus, the single exhaust stream 46 comprises a low velocity exhaust gas stream. Because of the low velocity, the gases of the single exhaust stream are more evenly distributed throughout the entire cross-sectional area of the wet scrubbing zone 27. Consequently, substantially all of the surface area of each of the filter mats 23 is utilized in cleaning the exhaust gases.

Also, by positioning the fan means 36, 37 upstream of the wet scrubbing zone 27, the fans and motors of the fan means 36, 37 are not exposed to a moist, corrosive environment.

I claim:
1. In the method for exhausting gases from an industrial building housing apparatus which generates heat and having inlet means for introducing atmospheric air into the building, and having a wet scrubbing zone through which the gases pass before being discharged into the atmosphere, the improvement comprising:
  diverting the exhaust gases into two separate streams;
  separately pressurizing each of the two streams upstream of said wet scrubbing zone;
  directing the pressurized streams into a mixing zone in opposition to each other to commingle them into a single exhaust stream having a greater static pressure than that of the building; and thereafter
  delivering the said single exhaust stream through the said wet scrubbing zone and thence into the atmosphere.

2. The improvement defined in claim 1 wherein said single exhaust stream passes vertically through said wet scrubbing zone.

3. The improvement defined in claim 1 wherein said pressurized streams are directed horizontally into said mixing zone.

4. In the method of exhausting gases from an industrial building housing apparatus which generates heat, and having inlet means for introducing atmospheric air into the building, and having a wet scrubbing zone through which the gases pass before being discharged into the atmosphere, the improvement comprising:
  diverting the exhaust gases into a first set of streams and a second set of streams;
  separately pressurizing each stream of each said set upstream of said wet scrubbing zone;
  directing the pressurized streams of each said set into a mixing zone in opposition with the pressurized streams of the other said set to commingle the pressurized streams of both sets into a single exhaust stream having a greater static pressure than that of the building; and thereafter
  delivering the said single exhaust stream through the said wet scrubbing zone and thence into the atmosphere.

5. The improvement defined in claim 4 wherein each pressurized stream of each said set is directed horizontally into said mixing zone in opposition with one pressurized stream of the other said set.

6. The improvement defined in claim 4 wherein the said single exhaust stream comprises relatively low velocity exhaust gases which are distributed throughout substantially the entire cross-sectional area of the said wet scrubbing zone and which pass vertically through the said wet scrubbing zone.

7. In apparatus for exhausting gases from an industrial building housing apparatus which generates heat, and having inlet means for introducing atmospheric air into the said building, exhaust duct means including a wet scrubbing zone through which the gases pass for discharging the gases into the atmosphere, the improvment comprising:

means for diverting the gases into two separate streams;

pressurizing means upstream of said exhaust duct means for separately pressurizing each of the said two separate streams to produce separate pressurized streams;

mixing chamber means spaced above said apparatus which generates heat and connected with said pressurizing means for commingling said separate pressurized streams into a single exhaust stream having a greater static pressure than that of the building; and connection means providing communication between said mixing chamber means and said exhaust duct means for delivering said single exhaust stream through the said wet scrubbing zone and thence into the atmosphere.

8. The improvement defined in claim 7 wherein said pressurizing means direct said separate pressurized streams horizontally into said mixing chamber means.

9. The improvement defined in claim 7 wherein said wet scrubbing zone is positioned horizontally above said mixing chamber means.

10. The improvement defined in claim 7 wherein the width of said mixing chamber means is greater than the corresponding width of said exhaust duct means.

References Cited
UNITED STATES PATENTS

| | | | |
|---|---|---|---|
| 2,907,263 | 10/1959 | Muller | 55—259 |
| 2,997,132 | 8/1961 | Allander et al. | 55—90 |

REUBEN FRIEDMAN, Primary Examiner

C. N. HART, Assistant Examiner

U.S. Cl. X.R.

55—223, 233; 261—105, 116